United States Patent [19]

Larson

[11] 4,201,085
[45] May 6, 1980

[54] APPARATUS FOR DETERMINING THE LIQUID LEVEL IN A TANK

[76] Inventor: Roger G. Larson, 911 Laguna Rd., Fullerton, Calif. 92635

[21] Appl. No.: 969,334

[22] Filed: Dec. 14, 1978

[51] Int. Cl.² ............................................. G01F 23/26
[52] U.S. Cl. .................................. 73/304 C; 361/284
[58] Field of Search .............. 73/304 C; 361/284, 278, 361/279

[56] References Cited

U.S. PATENT DOCUMENTS

| 3,588,859 | 6/1971 | Petree | 361/284 |
| 3,939,360 | 2/1976 | Jackson et al. | 73/304 C |
| 4,002,996 | 1/1977 | Klebanoff et al. | 73/304 C |

FOREIGN PATENT DOCUMENTS 220669 11/1957 Australia .................................. 361/284

Primary Examiner—Donald O. Woodiel
Attorney, Agent, or Firm—Philip M. Hinderstein

[57] ABSTRACT

Apparatus for determining the liquid level in tanks, such as are used in recreational vehicles, which utilizes a pair of parallel plates secured to the outside of the tank to avoid contact with the liquid inside of the tank. The plates have a generally vertical orientation so that as the liquid rises in the tank, an increasing area of the plates is adjacent to the liquid. The change in capacitance between the plates as a function of liquid level is utilized to generate an electrical signal indicative of liquid level. The problems caused by highly viscous liquids coating the inside surface of the tank and yielding false readings are solved by utilizing a high frequency driving signal.

8 Claims, 4 Drawing Figures

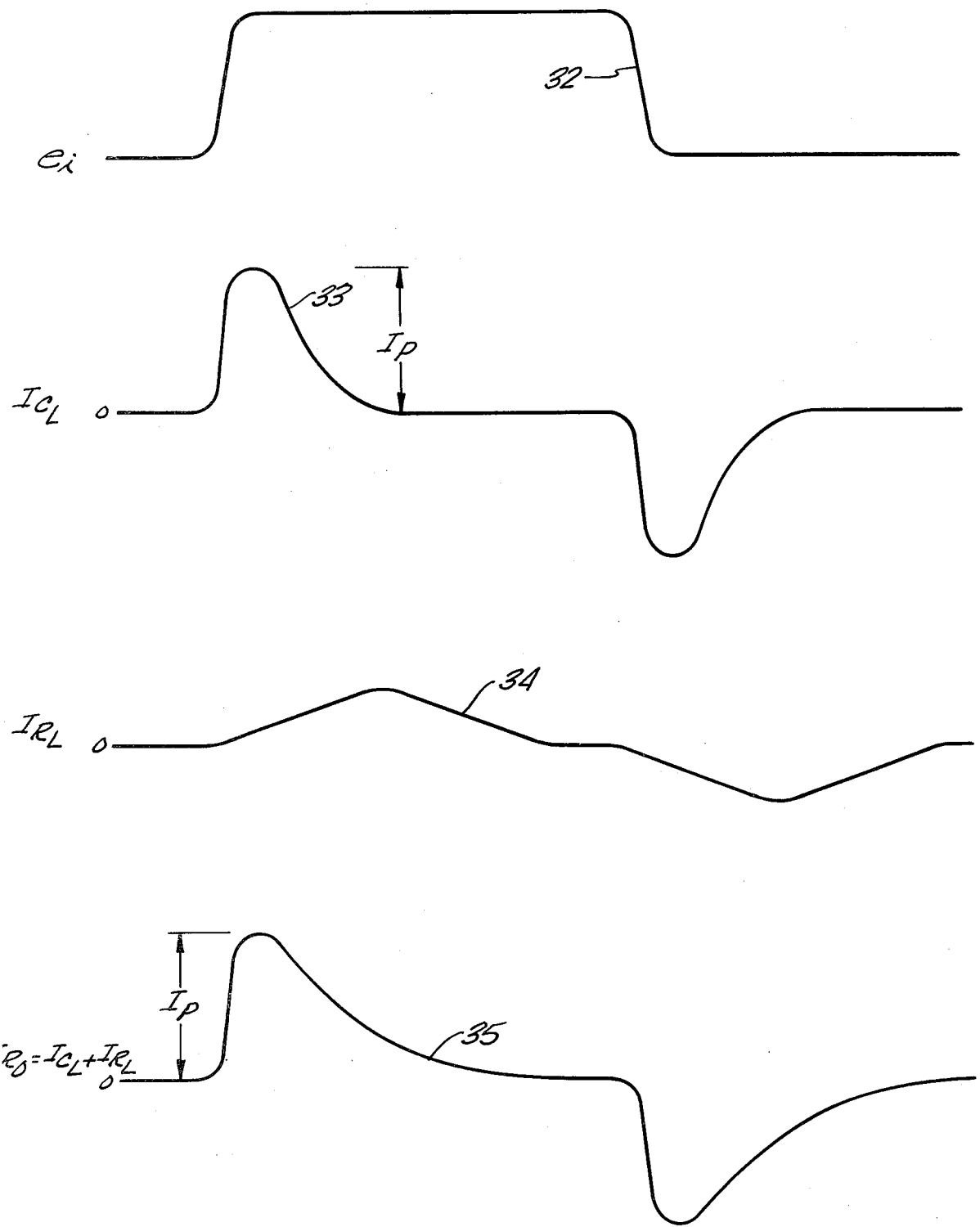

APPARATUS FOR DETERMINING THE LIQUID LEVEL IN A TANK

BACKGROUND OF THE INVENTION

1. Field of the Invention

The present invention relates to apparatus for determining the liquid level in a non-metallic tank and, more particularly, to externally mounted means for determining and providing a remote indication of the liquid level in a tank, such as a waste water tank for a recreational vehicle.

2. Description of the Prior Art

A wide variety of different types of liquid containing tanks are provided with measurement means for determining the liquid level therein. Usually, such measurement means are positioned within the tank and directly contact the surface of the liquid in order to determine the level thereof. On the other hand, in certain cases, such as in the measurement of the liquid level in waste water holding tanks used in recreational vehicles and the like, it is desirable that the measurement means not require an object to contact the liquid inside the tank or require holes to be drilled in the tank. Any obstruction or metallic object inside of a waste water tank will be subject to strong corrosive action and will become entangled with solid or semi-solid materials, causing a malfunction of the measuring device and/or preventing the tank from being completely emptied. This also leads to sanitary problems and unpleasant odors in the case of waste water holding tanks.

In order to determine the liquid level in a tank without contacting the liquid therein, it has been proposed to mount metal electrodes, probes, or plates on the tank, which plates are insulated from the liquid therein in a manner such that the capacitance between the plates varies as a function of the level of the liquid in the tank. This change in capacitance can then be utilized to provide an indication of liquid level. However, problems have been encountered with this type of system which has rendered it impractical for use heretofore.

For example, the liquid in a waste water holding tank typically has a fairly high viscosity and is very conductive because of the presence of human wastes and other solid or semi-solid materials. As a result, the tank contents tend to adhere to the walls of the tank. Whenever the tank is agitated or filled and then emptied, the walls become coated with a film of this highly conductive substance. As a result, the amount of signal current which can pass between two electrodes, probes, or plates is increased over the amount which would flow solely due to the liquid level in the tank, causing an incorrectly high reading. This situation can prevail for hours or even days until the inside surfaces of the tank walls have dried.

Still further, the various techniques that have been used heretofore to mount electrodes, probes, or plates on or in tanks and the configurations of such elements have not been conducive to the production of accurate and linear output readings.

SUMMARY OF THE INVENTION

According to the present invention, there is provided measurement means for determining the liquid level in tanks which solve these problems in a manner unknown heretofore. With the present measuring means, no element need be introduced inside of the tank, making the present measuring means ideally suited for waste water tanks, such as used in recreational vehicles. With the present apparatus, the measuring electronics may be mounted at a central point so that it can be connected to more than one tank.

The present invention utilizes plates having a configuration and being mounted such that an accurate, reliable and linear output is derived. Furthermore, this output is not effected by highly viscous liquids coating the walls of the tank with a highly conductive substance.

Briefly, the present apparatus for determining the liquid level in a tank comprises a pair of parallel plates secured to the outside surface of the tank in a manner such that the capacitance between the plates increases as the liquid level in the tank increases, an oscillator for producing an AC voltage, the AC voltage being coupled to one of the plates, an amplifier having an input and an output, a shielded cable connected between the other of the plates and the input of the amplifier, and a meter operatively coupled to the output of the amplifier for providing an indication of the liquid level in the tank.

According to the preferred embodiment of the invention, the AC driving voltage is a high frequency sine wave, a square or rectangular wave, or a pulse signal so that the derivative of the signal is high. This makes the capacitive portion of the output current large as compared to the resistive portion, which has the effect of eliminating the effects of the film on the tank walls.

It is therefore an object of the present invention to provide apparatus for determining the liquid level in a non-metallic tank.

It is a further object of the present invention to provide apparatus for determining the liquid level in a tank which does not require elements to be introduced inside of the tank.

It is a still further object of the present invention to provide apparatus for determining the liquid level in a tank which is unaffected by highly viscous and conductive substances within the tank.

Still other objects, features, and attendant advantages of the present invention will become apparent to those skilled in the art from a reading of the following detailed description of the preferred embodiment constructed in accordance therewith, taken in conjunction with the accompanying drawings wherein like numerals designate like or corresponding parts in the several figures and wherein:

BRIEF DESCRIPTION OF THE DRAWINGS

FIG. 3 is a series of waveforms useful in explaining the operation of the present invention.

DESCRIPTION OF THE PREFERRED EMBODIMENT

Figure 1:
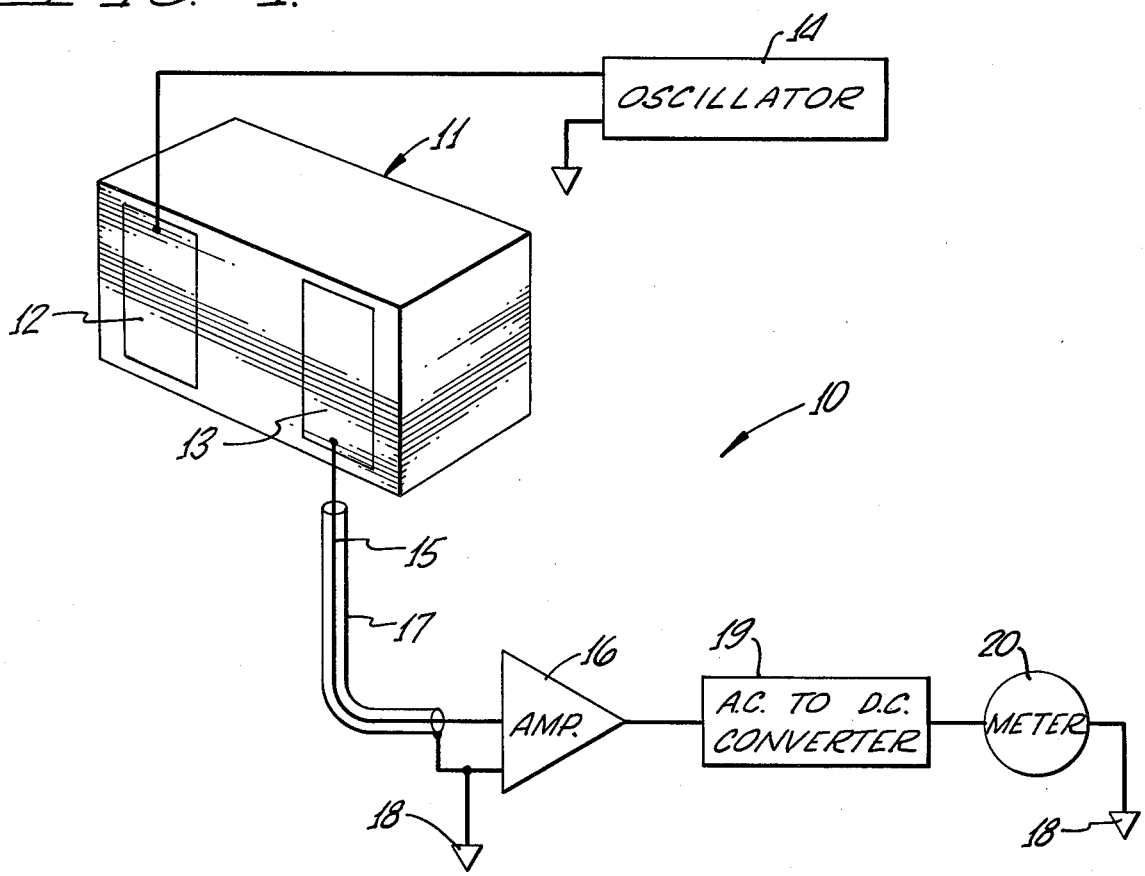
FIG. 1 is a block diagram of the preferred embodiment of the present apparatus for determining the liquid level in a non-metallic tank.

Referring now to the drawings and, more particularly, to FIG. 1 thereof, there is shown circuit means, generally designated 10, for determining the liquid level in a non-metallic tank 11. According to the present invention, tank 11 has a pair of parallel, spaced, metallic plates 12 and 13 secured to one wall thereof, in a vertical orientation, so that as the liquid rises in tank 11, more and more of plates 12 and 13 are positioned adjacent the liquid. Plates 12 and 13 may be attached to any vertical wall of tank 11, even different walls. As will be discussed more fully hereinafter, the capacitance between plates 12 and 13 will linearly increase as the liquid level increases. This phenomenon may be utilized to provide an output indicative of the liquid level in tank 11.

Circuit means 10 includes an oscillator 14 which produces an AC voltage which is maintained at a constant value. The output of oscillator 14 is connected to one of plates 12 or 13, here plate 12. The other of plates 12 or 13, here plate 13, is connected via a shielded cable 15 to one of the opposite polarity inputs of an amplifier 16. The other polarity input of amplifier 16 is connected, along with the shield 17 of cable 15, to ground 18.

The output signal of amplifier 16 is an AC signal indicative of the liquid level in tank 11. This signal is connected to the input of an AC-to-DC converter 19 which converts the AC signal to a DC signal suitable for driving a conventional meter 20.

In operation, circuit means 10 operates on the principle that water and other liquids have a dielectric constant which is considerably greater than air. Water, to be specific, has a dielectric constant of about seventy times that of air. Oscillator 14 furnishes an AC signal, the nature of which will be described more fully hereinafter. This signal is applied to the metal plate 12 secured to one of the walls of tank 11. If there is no liquid in tank 11, the capacitance between plates 12 and 13 will be relatively low and the AC impedence will be high, limiting the current which flows between plates 12 and 13. As the liquid level rises, the capacity between plates 12 and 13 will increase because the dielectric constant of the space between plates 12 and 13 increases. This causes a decrease in the AC impedence between plates 12 and 13, allowing more current to flow therebetween.

This current is conducted via shielded cable 15 to amplifier 16 which provides an output voltage whose amplitude is indicative of the current flowing between plates 12 and 13. The AC output signal is converted to a DC signal by converter 19 before application to meter 20 which provides a continuous reading indicative of the liquid level in tank 11.

Measuring the fluid level in a holding tank of a recreational vehicle, or any other tank containing human waste, poses a special problem. The holding tank fluid is very conductive and also contains solid and semi-solid substances which tend to adhere to the tank walls. Whenever the tank is agitated or filled and then emptied, the walls become coated with a film of this highly conductive substance. The amount of signal current which can pass between plates 12 and 13 is, therefore, increased over the amount which would flow due to the fluid in tank 11 alone and this can and does cause an incorrectly high reading. Often, it takes hours or even days until the material on the tank walls has dried, permitting the reading to return to normal.

Fortunately, I have discovered that the conductivity of the film on the walls of tank 11 is essentially resistive and, therefore, independent of frequency, while the conductivity of the liquid in tank 11 is both resistive and capacitive, the capacitive conductivity being a function of the frequency of oscillator 14. Therefore, and in accordance with the present invention, by making the capacitive portion of the current large compared to the resistive portion, a true measure of the liquid level in tank 11 can be obtained.

Figure 2A:
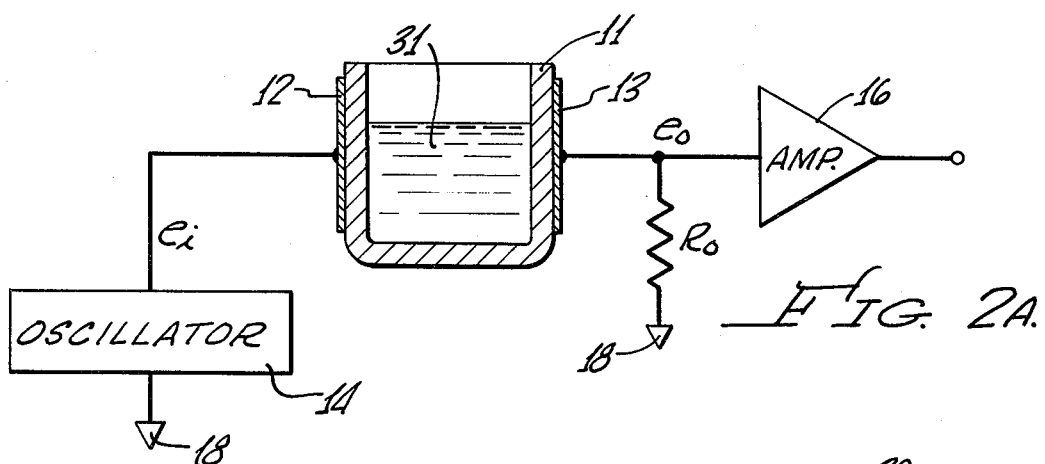
FIG. 2A is a simplified block diagram of a portion of the apparatus of FIG. 1, which diagram is useful in explaining the operation of the present invention.
Figure 2B:
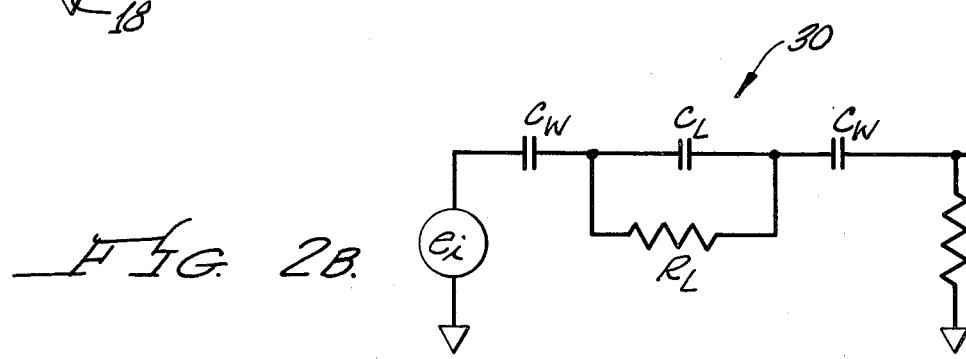
FIG. 2B is a diagram showing an equivalent electrical circuit for a portion of the apparatus of FIG. 2A.

Referring now to FIGS. 2A and 2B, there is shown a simplified representation of circuit means 10 and an equivalent electrical circuit 30 therefore. In FIG. 2B, $C_W$ represents the capacitance of the walls of tank 11, $C_L$ represents the capacitance of liquid 31, $R_L$ represents the resistance of liquid 31, and $R_o$ is a small current sensing resistor.

Since the current through a capacitance is $$I_C = C(dv/dt)$$

while that through a resistance is $$I_R = E/R,$$

one can cause the current through a capacitor to dominate by increasing dv/dt, i.e. raising the signal frequency. One way of doing this is to apply a very high frequency sine wave to plate 12. Another way would be to apply a pulse signal. The preferred way is to apply a square or rectangular wave to plate 12, since such a waveform is readily derivable. By making the rise and fall times very short, a very high dv/dt is obtained, resulting in a very high pulse of current through $C_L$. On the other hand, the current through resistor $R_L$ will initially be zero and will rise only as fast as the voltage across $C_L$ rises. Initially, then, the currently will be through the capacitances only. Somewhat later, current will start flowing through resistor $R_L$ and will reach some peak value and then decay as the voltage across $C_W$ builds up. The voltage appearing across $P_o$ will then be the sum of these two currents.

This effect is shown in the waveforms of FIG. 3 which show a hypothetical square wave input waveform 32 having finite rise and fall times. The current through $C_L$ is shown as waveform 33, whereas the current through $R_L$ is shown as waveform 34. The current through $R_o$, which is the sum of these two currents, is shown as waveform 35.

It can be seen that if one can make dv/dt high enough, the peak value $I_p$ of the current through $R_o$ will be determined by capacitances $C_L$ and $C_W$ only. Therefore, $I_p$ will be a function only of the level of liquid 31 in tank 11. The capacitive component of the liquid adhering to the walls of tank 11 will be extremely small compared to the capacitance of the bulk of liquid 11 and will cause an insignificant error. Similarly, the portion of the current due to $R_L$ will provide an insignificant error.

The foregoing analysis is true only if $R_o$ is small compared to the capacitive reactance of capacitors $C_W$ and $C_L$ in series. The voltage across $R_o$ will then accurately reflect the sum of the currents through the network shown in FIG. 2A. If $R_o$ is very large, the input voltage waveform will appear across it and the circuit will not work. In other words, the voltage across $R_o$ must be proportional to dv/dt, i.e. the circuit must be a differentiator.

It has been empirically established that when $R_o$ is made small enough, on the order of 20 to 30 ohms for tanks used in recreational vehicles, the reading response is essentially instantaneous. When it is significantly larger than that, long time lags are obtained.

It will be obvious to those skilled in the art that there are many circuits which will provide the derivative of an input signal. Any of these circuits may be used according to the present invention, the essence of which is to only measure the capacitive component of the signal current, eliminating the resistive component thereof. If this is done, an instantaneous reading of the liquid level in a non-metallic tank containing human waste may be obtained by using externally mounted conductive plates.

In addition, and in accordance with the present invention, by simply mounting a pair of parallel electrode plates on the outside surface of tank 11 with a generally vertical orientation so that as liquid 31 rises in tank 11, an increasing area of plates 12 and 13 is adjacent to liquid 11, an accurate and linear output can be derived indicative of the level of liquid 31 in tank 11. Furthermore, since the signal obtained from plates 12 and 13 is proportional to the areas thereof covered by liquid 31, odd shaped tanks can be read accurately and linearly by shaping pads 12 and 13 to make the areas covered correspond to the liquid volume. This is extremely easy to do since pads 12 and 13 can be made from aluminum foil and easily cut with a sharp knife or scissors.

Still further, pads 12 and 13 can be made insensitive to how level tank 11 is. For plates 12 and 13 mounted at one end or in one corner, the reading from meter 20 can vary considerably as tank 11 is tilted. Placing plates at all four corners of tank 11, two being connected to oscillator 14 and two being connected to amplifier 16, this situation is corrected since the amount uncovered on one plate will be compensated for by a corresponding covering of another. Similarly, one can place the plates on both sides of the middle of tank 11. When tank 11 is tilted in one direction, one plate is uncovered while the other is covered. In the other direction, the level will remain constant.

It can therefore be seen that according to the present invention, there is provided measurement means for determining the liquid level in tanks which solves the problems discussed hereinbefore. With circuit means 10, no element need be introduced inside of tank 11, making circuit means 10 ideally suited for waste water tanks, such as used in recreational vehicles. With the present apparatus, circuit means 10 may be mounted at a central point so that it can be connected to more than one tank 11.

While the invention has been described with respect to the preferred physical embodiment constructed in accordance therewith, it will be apparent to those skilled in the art that various modifications and improvements may be made without departing from the scope and spirit of the invention. Accordingly, it is to be understood that the invention is not to be limited by the specific illustrative embodiment, but only by the scope of the appended claims.

I claim:

1. Apparatus for determining the liquid level in a tank comprising:

a pair of electrode plates secured to the outside surface of said tank in parallel, horizontally spaced relationship whereby the capacitance between said plates increases as the liquid level in said tank increases;

means for generating an AC voltage of a sufficiently high frequency that the capacitive portion of the current between said plates is large compared to the resistive portion thereof;

means for coupling said AC voltage to one of said plates;

differentiator circuit means having an input and an output;

means for coupling the other of said plates to said input of said differentiator circuit means; and indicator means operatively coupled to said output of said differentiator circuit means for providing a quantitative indication of the volume of liquid in said tank.

2. Apparatus according to claim 1, wherein said means for generating an AC voltage comprises:

means for generating a high frequency sine wave.

3. Apparatus according to claim 1, wherein said means for generating an AC voltage comprises:

means for generating a pulse signal.

4. Apparatus according to claim 1, wherein said means for generating an AC voltage comprises:

means for generating a square wave.

5. Apparatus according to claim 1, wherein said means for generating an AC voltage comprises:

means for generating a rectangular wave.

6. Apparatus according to claim 1, wherein the shapes of said plates are such that the areas covered thereby as said liquid level rises in said tank is directly proportional to the volume of liquid in said tank.

7. Apparatus according to claim 1, wherein each of said plates of said pair of plates comprises two plates secured to opposite outside surfaces of said tank and electrically interconnected.

8. Apparatus according to claim 1, wherein each of said plates has a vertical dimension which is approximately the same as the height of said tank so that as the liquid rises in said tank, an increasing area of said plates is adjacent said liquid.

* * * * *